United States Patent [19]
Holmstrom et al.

[11] 3,760,415
[45] Sept. 18, 1973

[54] MICROWAVE CRASH SENSOR FOR AUTOMOBILES

[75] Inventors: F. Ross Holmstrom; John B. Hopkins, both of Cambridge, Mass.

[73] Assignee: The United States of America as represented by the Secretary of the Department of Transportation, Washington, D.C.

[22] Filed: Dec. 23, 1971

[21] Appl. No.: 211,579

[52] U.S. Cl.............. 343/7 ED, 180/98, 343/5 PD, 343/8, 343/112 CA
[51] Int. Cl............................................. G01s 9/46
[58] Field of Search.................. 343/7 ED, 112 CA, 343/113 R, 100 ST, 5 PD, 8, 9; 180/98

[56] References Cited
UNITED STATES PATENTS

| | | | |
|---|---|---|---|
| 3,394,342 | 7/1968 | Walker............................. | 343/7 ED |
| 3,512,155 | 5/1970 | Bloice.............................. | 343/5 PD |
| 3,684,309 | 8/1972 | Uchiyamada et al............. | 343/7 ED |
| 3,412,402 | 11/1968 | Beckwith...................... | 343/112 CA |

*Primary Examiner*—Benjamin A. Borchelt
*Assistant Examiner*—G. E. Montone
*Attorney*—Herbert E. Farmer et al.

[57] ABSTRACT

Disclosed is a vehicle safety system in which a bistatic Doppler system senses objects in the path of a subject vehicle and activates a passenger restraint device, such as an inflatable "air-bag" in response thereto. In another preferred embodiment, the Doppler system is combined with mechanical sensing apparatus to deploy the restraint device during lower speed collisions. In addition, a system is disclosed that deploys a passenger restraint device only in response to simultaneous signals from two Doppler systems.

6 Claims, 4 Drawing Figures

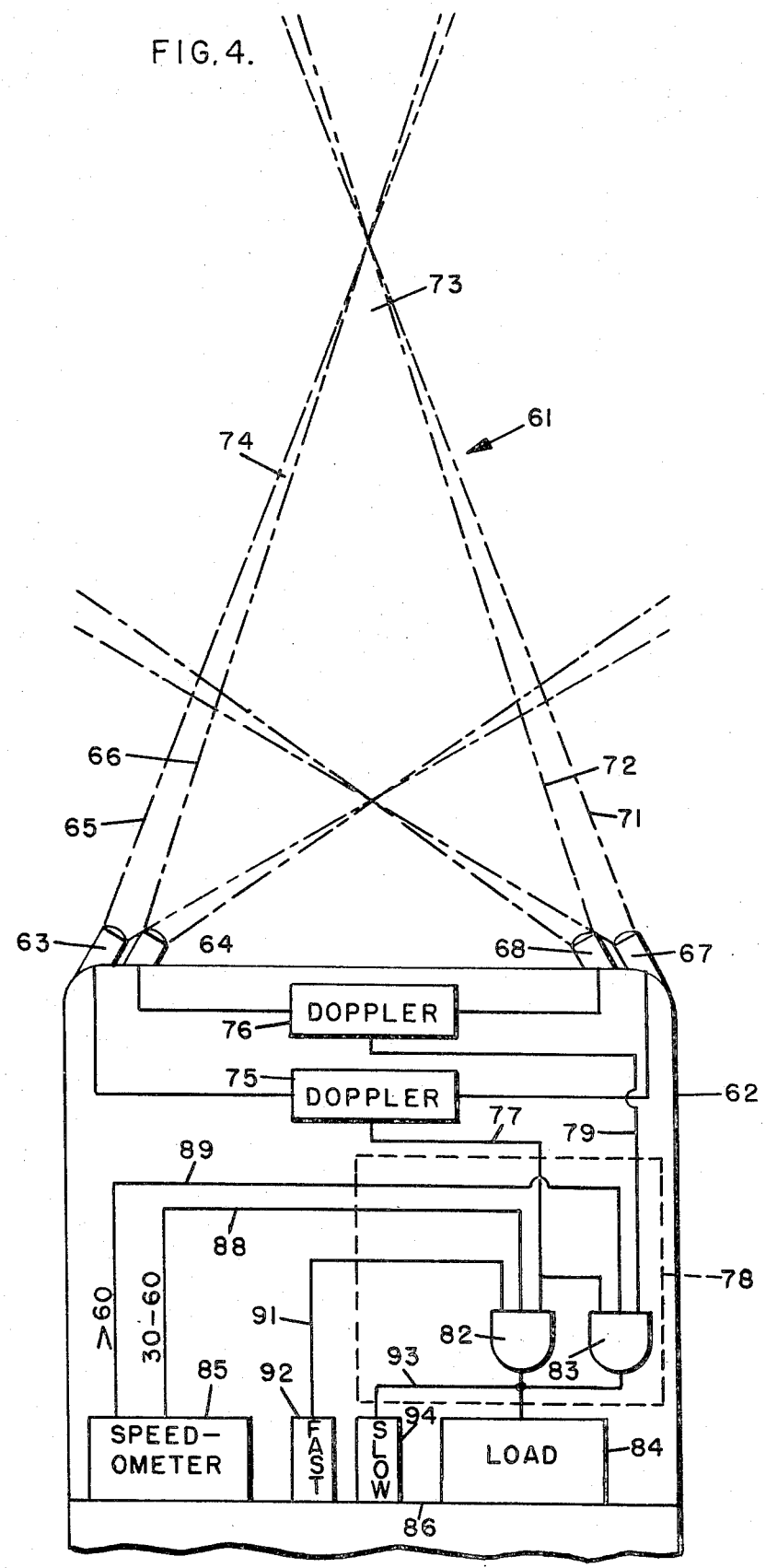

MICROWAVE CRASH SENSOR FOR AUTOMOBILES

ORIGIN OF THE INVENTION

The invention described herein was made by two employees of the United States Government and may be manufactured and used by or for the Government for governmental purposes without the payment of any royalties thereon or therefor.

BACKGROUND OF THE INVENTION

A source of major concern in recent years has been the high number of deaths and injuries associated with motor vehicle accidents in the United States. The magnitude of the problem has made improved auto safety both an important subject and an explicit national goal. Two general approaches to the problem are evident. First, road construction and traffic flow patterns and the like must be studied to minimize the number of accidents occurring. Secondly, realizing that some accidents inevitably will occur, vehicle crashworthiness becomes an important consideration. This disclosure is concerned with the second of these two approaches, that of crashworthiness.

Crashworthiness is a vast topic involving total vehicle design. In part, proper use must be made of energy absorbing and deflecting structures with concern for both the vehicle-obstacle collision and the occupant-vehicle collision. The latter impact is called the "second collision " and occurs when a vehicle has been brought to a nearly instantaneous stop and the occupants collide with the interior of the passenger compartment. Various types of occupant restraint systems have been devised to prevent the second collision. In studying these systems it is useful to distinguish between restraint systems which require passenger effort, such as seat belts, and those that provide protection regardless of passenger action. The conventional systems that require passenger action, for example, seat belts or shoulder harnesses, are extremely effective when utilized but the National Highway Traffic Safety Administration has determined that they are not used often enough to bring about the desired reduction in death and injury. Nor does there appear to be reason to hope for a marked change in this situation. Thus, interest has been focused increasingly on automatic restraint, which, when perfected can provide a large measure of protection for the motoring public.

Automatically deployable restraint systems, such as "air-bags," are now in the testing stages and will soon be available on new automobiles. Actuation is most commonly provided by a mechanical accelerometer. Mechanical and electrical integration over a period of time is generally provided to prevent inadvertent actuation in response to minor collisions or road irregularity. The total response and integration time associated with such sensors can reach 20 to 40 milliseconds, with an additional 25 milliseconds required for restraint deployment, thereby seriously compromising the effectiveness of the dynamic restraint, particularly for small cars at high impact velocities. It has been found that optimum response at high speeds requires that deployment of the restraint device begin 50–100 cm before impact.

The object of this invention, therefore, is to provide a passenger restraint system that can anticipate collisions and respond rapidly enough to protect the occupants of small cars at high impact velocities and can be fabricated inexpensively so that the total cost of an automobile will not increase significantly. In addition, the system must provide very good discrimination between "false alarms" and true collisions and respond to nearly every true collision and be substantially impervious to the various environmental conditions in which an automobile may operate. Also, it is a further object that the system require only a minimal amount of routine maintenance.

SUMMARY OF THE INVENTION

This invention is characterized by a vehicle safety system for actuating a passenger restraint device when an imminent collision is sensed. A transmitter and a directional transmitter antenna project a beam of transmitted energy. A receiver is coupled to a directional receiving antenna that is substantially displaced from the transmitter antenna and receives energy impinging thereon in a receiving beam. The receiving and transmitted beams intersect to define a zone of interference that is in front of the subject vehicle during normal vehicular motion. The receiving beam will be present only if an object is within the zone of interference and reflects a portion of the transmitted beam. A Doppler system connected to the receiver samples the transmitted energy, and, in response to a received Doppler signal, activates the passenger restraint device. A primary advantage of this system is that it distinguishes well between large and small objects. That is, only an object of substantial size can provide sufficient reflection to activate the restraint device. However, systems that utilize a single antenna for transmitting and receiving may respond to very small objects near the antenna. Clearly this is undesirable. For example, response should not occur if a small animal or a bird passes near an antenna. Another major advantage is inherent position discimination, with no additional sensor components. The present system can operate with either microwave or ultrasonic Doppler systems. The choice between microwaves and ultrasonics is made by consideration of factors such as the nature of the stray interfering radiation likely to impinge on the receiving antenna and the types of targets for which discrimination is desired.

Further features of the invention includes temporal and amplitude threshold detectors and a discimination apparatus within the Doppler apparatus. The temporal threshold detector insures that a Doppler signal to which the system responds includes a predetermined number of detected cycles within a predetermined minimum duration. Thus, transients will not cause actuation of the restraint system. The amplitude threshold is sensitive to a predetermined minimum amplitude such that Doppler signals below this level will not trigger actuation. Such low level signals generally represent objects such as small animals or papers blowing in the wind that are of such a low mass that actuation in response thereto is not desired. Thus, the amplitude threshold further insures that "false alarms" will not cause actuation of the system. Finally, the discrimination apparatus only passes Doppler signals that are above a predetermined minimum frequency. Low frequency signals correspond to a low relative velocity between the vehicle and the object detected. Therefore, a vehicle slowly rolling up behind another vehicle at a stop sign or while parking will not trigger actuation. Consequently, the three circuit elements noted above further guarantee accurate discrimination between objects for which actuation is desired and objects for which actuation is not desired.

Another preferred embodiment of the invention utilizes two transmitters and transmitter antennas that produce two transmitted beams of substantially different frequencies and two receiver and receiver antenna combinations to receive reflected energy therefrom. In this embodiment the restraint device is deployed only if an imminent collision is sensed by the separate Doppler systems simultaneously. Stray radiation impinging on a receiving antenna may be interpreted by a Doppler system as a received Doppler signal. However, it is highly unlikely that two Doppler systems operating on substantially different frequencies simultaneously will receive interference such that both will be activated. Thus, the possibility of false alarms due to stray radiation is substantially reduced. Alternately, this embodiment can provide two spacially separated zones of interference so that a larger area can be sensed.

Another feature of the invention is the combination of a Doppler detection system with mechanical impact sensors and velocity discrimination apparatus. The velocity discrimination apparatus automatically renders the system responsive to the more reliable mechanical sensors at low vehicle velocities when the advance warning provided by the bistatic Doppler system is not needed. In addition, when the vehicle velocity is in an intermediate range the system is rendered responsive to a fast mechanical sensor and a bistatic Doppler system such that both must sense a collision to cause actuation of the passenger restraint device. This sytem is advantageous in that the fact response mechanical sensors which reliably detect collision but offer little discrimination regarding target size and speed, are utilized automatically for intermediate vehicle velocities for which advance actuation is not required but for which completely mechanical sensing systems offer insufficiently rapid response.

DESCRIPTION OF THE DRAWINGS

These and other objects and features of the present invention will become more apparent upon a perusal of the following description taken on conjunction with the accompanying drawings wherein:

FIG. 4 is a block diagram of a safety system that includes two Doppler systems and mechanical sensors.

DESCRIPTION OF THE PREFERRED EMBODIMENTS

Figure 1:
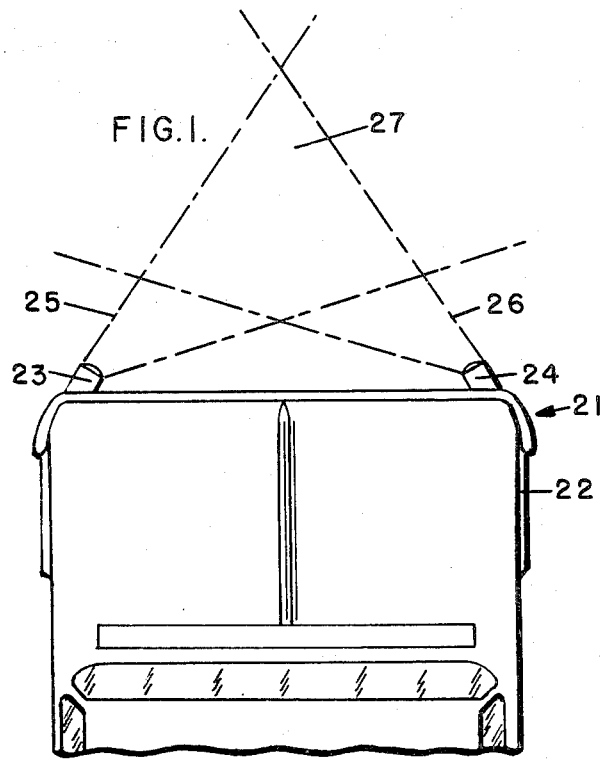
FIG. 1 is a schematic drawing illustrating the front end of an automobile with transmitter and receiving beams indicated so as to define a zone of interference.
Figure 2:
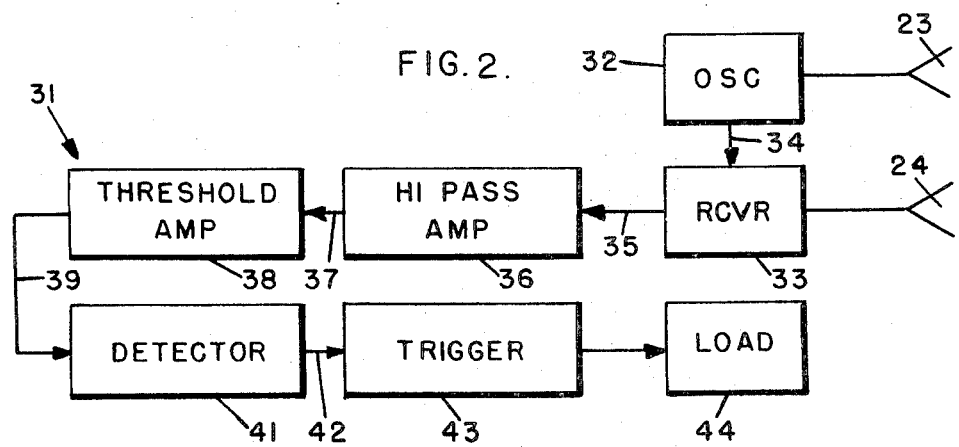
FIG. 2 is a block diagram of a linear Doppler circuit utilized in the subject safety system.

Referring first to FIGS. 1 and 2 there is shown an automobile safety system 21 that is mounted on the front of an automobile 22 with a directional transmitter antenna 23 and a directional receiving antenna 24 mounted thereon. A transmitted beam 25 is projected from the transmitter antenna 23 and energy within a receiving beam 26 is detected by the receiver antenna 24. The beams 25 and 26 intersect in a zone of interference 27. Any object within the zone of interference 27 will reflect some of the transmitted beam 25 toward the receiver antenna 24 as the receiving beam 26.

Referring particularly to FIG. 2 there is shown a block diagram of a Doppler apparatus 31 that is utilized in the embodiment 21. A microwave transmitter 32 is connected to the transmitting antenna 23 and a microwave receiver 33 is connected to the receiver antenna 24. In addition, a sampling line 34 carries a sample of the transmitted signal to the receiver 33. Any Doppler signal resulting from mixing in the receiver 33 of the transmitter signal sample and the received signal is carried by a line 35 to a high pass discriminator amplifier 36 that only passes signals to a line 37 that are above a certain predetermined minimum frequency. Next, the signal is received by amplitude threshold amplifier 38 that produces an output on a line 39 only if the signal received thereby is above a certain predetermined minimum amplitude. Inasmuch as the signal received by the threshold amplifier 38 is an a.c. Doppler signal, only portions thereof can be above the predetermined minimum threshold. Consequently, the output on the line 39, if any, is a series of rectangular waves that persists only as long as the appropriate Dopper signal is delivered from the receiver 33 on the line 35. This rectangular wave train is fed to a temporal integrator 41. A slight leakage is exhibited in the integrator 41 so only pulses closely spaced in time will cause a sufficient voltage accumulation to produce an output on a line 42. A trigger 43 activates a load 44 or a passenger restraint device, in response to any signal on the line 42.

During operation of the embodiment 21, shown in FIGS. 1 and 2, the transmitter 32 continually produces the transmitted beam 25 and, whenever an object is within the zone of interference 27, a receiving beam 26 is produced and detected by the receiver 33. If the output of the receiver 33 on the line 35 is above the cut-off frequency of the high pass amplifier 36, indicating that the object within the zone of interference 27 is approaching the automobile 22 at a velocity above the predetermined minimum velocity, the signal will pass to the threshold amplifier 38. Only if portions of the signal delivered to the threshold amplifier 38 are of sufficiently high amplitude to trigger the threshold amplifier, indicating that the object approaching the automobile 22 is sufficiently large, will the threshold amplifier produce the rectangular wave signals on the line 39. The integrator 41 will activate the trigger 43 only if the rectangular wave signals on the line 39 persist for a substantial period of time, thus indicating that an object is indeed being sensed within the zone of interference 27 and that the signal is not the result of transients within the system 21. Consequently, the load, or restraint device, 44, will be deployed only if an object of sufficient size is within the zone of intereference 27 and approaching the automobile 22 at a velocity above the predetermined minimum velocity.

Figure 3:
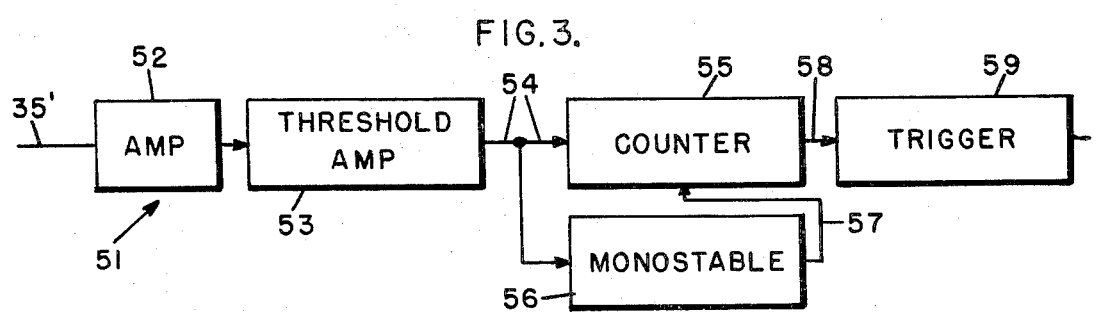
FIG. 3 is a block diagram of a digital circuit that functions similarly to the circuit shown in FIG. 2.

Referring next to FIG. 3 there is shown a block diagram of a digital Doppler apparatus 51. A line 35' delivers Doppler signals to an amplifier 52. The line 35' carries Doppler signals from a receiver similar to the receiver 33 shown in FIG. 2. Consequently, any signals present on the line 35' are similar to those on the line 35 in the embodiment 31. Since amplifier 52 performs no filtering function, a Doppler signal of an increased voltage level is delivered to an amplitude threshold amplifier 53. If the signals received by the threshold amplifier 53 are above a predetermined minimum amplitude the threshold amplifier produces an output. Consequently, the output of the threshold amplifier 53 is similar to the output of the amplifier 38 shown in FIG. 2. That is, a series of rectangular wave pulses is produced if the input includes portions that are of an amplitude greater than the minimum predetermined amplitude. A line 54 delivers the output of the threshold amplifier 53 to an 8 bit discriminator counter 55 and a temporal threshold monostable multivibrator 56. Under normal conditions the monostable multivibrator 56, through a line 57, holds the counter 55 at a zero count. An output on the line 54 sets the monstable multivibrator 56 in its unstable state and thus allows the counter 55 to commence counting. An output from counter 55 appears on a line 58 only if 8 or more pulses are delivered to the counter before the monostable multivibrator 56 returns to its stable state, thereby disenabling the counter. In the event that the output appears on the line 58, the trigger 59 is enabled. The trigger 59 is similar to trigger 43 shown in FIG. 2, and similarly activates a load (not shown).

During operation of the embodiment 51 Doppler signals appear on the line 35' only if an object is within the zone of interference. In that event, the signals on the line 35' are identical to those on the line 35 in the embodiment 31. Only if the object within the zone of interference is sufficient in size will the threshold amplifier produce the characteristic rectangular wave output on the line 54. An output on the line 54 sets the monostable multivibrator 56 in its unstable state and thus starts the counter 55. If the signal on the line 35' is of a short duration, as, for example, may be due to transients within the receiver or transmitter, the signal on the line 54 will cease before the counter 55 has registered a sufficient number of pulses to produce an output. Alternately, if the signal on the line 35' represents a real impending collision, but the vehicle speed is so low that actuation of the protection device is not desired, the signal on the line 54 will be of a very low frequency. Such a low frequency signal will not produce an output on the line 58 because the monostable multivibrator 56 will return to its stable state and stop the count before the counter 55 has completed a cycle. Consequently, the embodiment 51 responds only to objects of a size greater than a minimum predetermined size approaching the vehicle at a speed greater than a minimum predetermined speed and only if the signals therefrom persist for a significant period of time. The embodiment 31 shown in FIG. 2 exhibited similar response. The two embodiments 31 and 51 are therefore interchangeable.

Referring next to FIG. 4 an illustration shows another preferred embodiment 61 of a vehicle safety system mounted on the front of an automobile 62. Two directional transmitting antennas 63 and 64 produce two transmitted beams 65 and 66 respectively. Mounted on the right front corner of the automobile 62 are two directional receiving antennas 67 and 68 that receive energy impinging thereon from two receiving beams 71 and 72 respectively. The transmitted beam 65 and the receiving beam 71 define a zone of interference 73 similar to the zone of interference 27 shown in FIG. 1. Similarly, the transmitted beam 66 and the receiving beam 72 define a zone of interference 74 similar to the zone 73 and generally superimposed thereon. A Doppler apparatus 75 is connected to the antennas 63 and 67 and including therein a receiver and transmitter. A second Doppler apparatus 76, similar to the apparatus 75 is connected to the antennas 64 and 68. Each of the two Doppler apparatus 75 and 76 includes, in addition to the receiver and transmitter, either the circuit 31 (FIG. 2) or the circuit 51 (FIG. 3) as the user wishes. A line 77 couples the apparatus 75 to a trigger 78 and a line 79 couples the apparatus 76 to the trigger. Signals on the line 77 and 79 are similar to those on the line 58 shown in FIG. 3. That is, signals only appear on the lines 77 or 79 if "real" collisions are sensed within the corresponding zone of interference 73 or 73. In addition, as discussed with respect to the previously described embodiments, the object within the zone of interference 73 or 74 must be of sufficient size and velocity to trigger the Doppler apparatus 75 or 76. It should be noted that the Doppler apparatus 75 and 76 operate on substantially different frequencies, and independently of each other. Therefore, they are activated independently from objects within the zones of interference 73 and 74. In addition, spurious radiation impinging on the receiving antennas 67 and 68 may be of proper amplitude and frequency to trigger one Doppler apparatus 75 or 76, however it is highly unlikely that both apparatus 75 and 76 will produce false alarms simultaneously. By employing, in a modified version, information inherently available in the Doppler system 75, 76 a speedometer 85 can provide an output determined by relative rather than absolute velocity. In that case the overall system response will be dependent upon the velocity at which the vehicle is closing on an impending object.

Within the trigger 78 there are two AND gates 82 and 83. Outputs of both of the AND gates 82 and 83 are connected together and to a load 84 similar to the load shown in FIG. 2. Consequently, the load is activated in the event that either of the gates 82 or 83 produces an output. In the event that the vehicle velocity is in a predetermined intermediate range, for example 30 to 60 mph, an enabling signal is delivered on a line 88 to the AND gate 82 by the speedometer 85. When the vehicle velocity is above the intermediate range, for example above 60 mph, an enabling signal is delivered on a line 89 to the AND gate 83. Consequently, at any given vehicle velocity, only one AND gate 82 or 83 will be capable of producing the required output to actuate the load 84.

The line 79 from the second Doppler apparatus 76 is connected to another input of the AND gate 83. The line 77, from the Doppler apparatus 75 is connected to both the AND gates 82 and 83. In addition, a line 91 connects a rapid response mechanical impact sensor 92 such as an impact switch to the gate 82. Finally, a line 93 connects a slower response impact sensor 94 such as an acceleration response "g" switch to the load 84. The acceleration responsive sensor 94 has the capability of detecting potentially injury producing collision but requires a certain time to respond.

During operation of the embodiment 61, if the vehicle velocity is below about 30 mph, the anticipatory warning of a Doppler ranging system to deploy a passenger restraint device in unnecessary. Under those conditions, the mechanical sensor 94 is sufficiently fast and also discriminates between potentially harmful collisions and minor impacts. For example, the sensor 94 will distinguish between a collision with a massive object and road vibration or the like. Consequently, when the vehicle velocity is below 30 mph, activation of the sensor 94 produces an enabling signal on line 93 that directly energizes the load 84.

When the vehicle velocity is in an intermediate range, for example 30 to 60 mph, the response time of the relatively slow sensor 94 is inadequate. However, collision anticipation is not yet essential. Therefore, the quick response sensor 92 is used in combination with Doppler detection to improve overall detection reliability and target discrimination in the velocity range. Consequently, the rapid response sensor 92 is connected to the AND gate 82 that is enabled by the line 88 when the vehicle is moving at an intermediate velocity. However, the line 77 from the Doppler apparatus 75 is also connected to the AND gate 82. Thus, when the vehicle is moving at an intermediate velocity, only the AND gate 82 is capable of producing the requisite output, and only then when an enabling signal is received both on the line 77 and the line 91. Therefore, the load 84 is energized only if the Doppler apparatus 75 senses an object within the zone of interference 73, and the impact sensor 92 subsequently detects a collision. For this reason, spurious radiation impinging on the receiving antenna 67 does not cause false actuation since no collision will be subsequently sensed by the sensor 92. Conversely, road vibration or impacts with small objects will not cause actuation because the Doppler system 65 will not deliver an enabling signal on the line 77 unless there is an object of given size within the zone 73.

Finally, at highest speeds, for example, above 60 mph, collisions must be anticipated before they occur. Consequently, mechanical sensors 92 and 94 do not provide sufficient warning. Requisite warning is supplied only by an anticipatory sensing system, such as the embodiment 21. However, such an embodiment 21 may be subject to false alarms to spurious radiation impinging on the receiving antennas. Consequently, when the vehicle is traveling at a speed above the intermediate velocity range the line 89 enables the AND gate 83. Signals must be present on both the lines 77 and 79 in order that the AND gate 83 produce an output. Thus both the Doppler systems 75 and 76 must sense an object within their respective zones of interference 73 and 74. The chance of a false actuation due to spurious radiation is greatly reduced inasmuch as the two systems 75 and 76 operate at substantially different frequencies. Therefore, the chance is remote that both systems 75 and 76 will be actuated simultaneously in the absence of an impending collision.

Obviously, many modifications and variations of the present invention are possible in light of the above teachings. For example, both the embodiments 21 and 61 can operate with wave energy other than microwave such as ultrasonic or optical, and both may be used on vehicles other than automobiles. It is to be understood, therefore, that the invention can be practiced otherwise than as specifically described.

We claim:

1. A safety system for protecting the passengers of a vehicle from collision related injury and comprising the following:

transmitter means coupled to directional transmitter antenna means for transmitting a beam of energy into a given zone ahead of a vehicle supporting said transmitter means and antenna means;

receiver means coupled to directional receiving antenna means oriented so as to receive energy only from a limited intersection portion of said given zone, said intersection portion of said given zone lying directly in front of the vehicle during forward movement thereof;

Doppler means coupled to said transmitter means and said receiver means to detect Doppler signals produced by energy reflections from objects within said intersection portion of said given zone, said Doppler means including logic means comprising amplitude threshold means providing an approximate target size threshold, Doppler frequency threshold means providing a closing rate threshold, and Doppler cycle count threshold means providing a predetermined minimum number of Doppler cycles threshold; and active passenger protection means responsive to said Doppler means to protect passengers when objects are detected within said intersection portion of said given zone.

2. A system according to claim 1 wherein said transmitter means comprises an ultrasonic transmitter and said receiver means comprises an ultrasonic receiver.

3. A system according to claim 1 wherein said transmitter means comprises a microwave transmitter and said receiver means comprises a microwave receiver.

4. A system according to claim 1 wherein said transmitter means comprises two transmitters and two transmitter antennas so as to produce two generally superimposed transmitted beams of substantially different frequencies, said receiver means comprises two receiver and receiver antenna combinations, one of said combinations being responsive to one of the transmitted beams and the other one of said combinations being responsive to the other transmitted beam, said Doppler means comprises a first Doppler detector coupled to said one combination and a second Doppler detector coupled to said other combination, and wherein said active passenger protection system comprises trigger means for activating said active passenger protection means only in response to enabling signals received simultaneously from both said one combination and said other combination.

5. A system according to claim 1 including impact sensor means actuated by impact, a second Doppler frequency threshold means of a lower value than said first Doppler frequency threshold means to provide a lower closing rate threshold, and where said protection means comprises trigger means activated only in response to both object detection by the signal from said second Doppler frequency threshold means and activation of said impact sensor means.

6. A system according to claim 1 wherein said intersection portion of said given zone is located in a region less than 10 feet ahead of the vehicle.

* * * * *